(12) United States Patent
Chen et al.

(10) Patent No.: US 11,777,115 B2
(45) Date of Patent: Oct. 3, 2023

(54) MANUFACTURABLE HUMIDIFIER

(71) Applicant: HYZON MOTORS INC., Honeoye Falls, NY (US)

(72) Inventors: Jie Chen, Shanghai (CN); Zhijun Gu, Zhangjiagang (CN); Gary M. Robb, Honeoye Falls, NY (US)

(73) Assignee: HYZON MOTORS INC., Honeoye Falls, NY (US)

( * ) Notice: Subject to any disclaimer, the term of this patent is extended or adjusted under 35 U.S.C. 154(b) by 0 days.

(21) Appl. No.: 17/459,267

(22) Filed: Aug. 27, 2021

(65) Prior Publication Data

US 2022/0069322 A1  Mar. 3, 2022

Related U.S. Application Data

(60) Provisional application No. 63/071,481, filed on Aug. 28, 2020.

(51) Int. Cl.
*H01M 8/04119* (2016.01)
*B23P 15/26* (2006.01)
*B21D 53/02* (2006.01)

(52) U.S. Cl.
CPC ......... *H01M 8/04149* (2013.01); *B23P 15/26* (2013.01); *H01M 8/04141* (2013.01); *B21D 53/02* (2013.01)

(58) Field of Classification Search
CPC ...... B23P 15/26; B23P 2700/12; B21D 53/02; H01M 8/04126; H01M 8/04141; H01M 8/04149; H01M 8/0297; H01M 8/1004–1006; H01M 50/46; B01D 63/081; B01D 63/082

See application file for complete search history.

(56) References Cited

U.S. PATENT DOCUMENTS

| | | |
|---|---|---|
| 8,091,868 B2 | 1/2012 | Robb et al. |
| 8,431,275 B2 | 4/2013 | Abd Elhamid et al. |
| 2005/0191530 A1* | 9/2005 | Mossman .......... H01M 8/04119 429/414 |
| 2006/0112827 A1 | 6/2006 | Okada et al. |
| 2009/0092863 A1 | 4/2009 | Skala |
| 2010/0019400 A1 | 1/2010 | Robb et al. |
| 2012/0181712 A1 | 7/2012 | Vanderwees et al. |

(Continued)

OTHER PUBLICATIONS

Written Opinion of the International Searching Authority dated Nov. 26, 2021.

*Primary Examiner* — Matthew P Travers
(74) *Attorney, Agent, or Firm* — Ward Law Office LLC; Jacob M. Ward (57) ABSTRACT

A method for assembling a fuel cell humidifier can include steps of providing a first humidifier plate and a humidifier membrane. The first humidifier plate can have a first top plate surface. The humidifier membrane can have a bottom membrane surface. The bottom membrane surface of the humidifier membrane can be disposed on the first top plate surface of the first humidifier plate. The first humidifier plate can be partially melted. This can permit the first top plate surface of the first humidifier plate to permeate into the bottom membrane surface of the humidifier membrane. The first humidifier plate can be cooled, which can fuse the first top plate surface of the first humidifier plate with the bottom membrane surface of the humidifier membrane.

5 Claims, 6 Drawing Sheets

(56) References Cited

U.S. PATENT DOCUMENTS

| | | | |
|---|---|---|---|
| 2015/0064600 A1* | 3/2015 | Katsuno | H01M 8/0286 156/583.1 |
| 2015/0300754 A1* | 10/2015 | Vandermeulen | F28D 3/04 29/890.03 |

* cited by examiner

MANUFACTURABLE HUMIDIFIER

CROSS-REFERENCE TO RELATED APPLICATIONS

This application claims the benefit of U.S. Provisional Application Ser. No. 63/071,481 filed on Aug. 28, 2020. The entire disclosure of the above application is incorporated herein by reference.

FIELD

The present disclosure relates to fuel cell stacks, and more particularly, to humidifiers for fuel cell stacks.

INTRODUCTION

This section provides background information related to the present disclosure which is not necessarily prior art.

Fuel cells have been proposed as a clean, efficient, and environmentally responsible power source for various industries, including manufacturing centers, homes, and electric vehicles among other applications. One example of a fuel cell is a proton exchange membrane (PEM) fuel cell. The PEM fuel cell can include a membrane electrode assembly (MEA) that can have a thin, solid polymer membrane-electrolyte having an anode and a cathode with a catalyst on opposite faces of the membrane-electrolyte. Generally, the MEA can be disposed between a pair of porous conductive materials, also known as gas diffusion media, which distribute gaseous reactants, for example, hydrogen and oxygen or air, to the anode and cathode layers. The hydrogen reactant is introduced at the anode where it reacts electrochemically in the presence of the catalyst to produce electrons and protons. The electrons are conducted from the anode to the cathode through an electrical circuit disposed therebetween. Simultaneously, the protons pass through the electrolyte to the cathode where an oxidant, such as oxygen or air, reacts electrochemically in the presence of the electrolyte and catalyst to produce oxygen anions. The oxygen anions react with the protons to form water as a reaction product. The MEA of the PEM fuel cell can be sandwiched between a pair of electrically conductive bipolar plates which serve as current collectors for the anode and cathode layers.

Fuel cell humidifiers can be important to overall system performance and reliability of a fuel cell stack. An example of a fuel cell humidifier is disclosed in U.S. Pat. No. 8,091,868 to Robb et al., the entire disclosure of which is incorporated herein by reference. Fuel cell humidifiers can be configured to provide humidity to the incoming oxidant or hydrogen fuel stream of fuel cells. Undesirably, without humidification, the fuel cell membrane can become dry, which can reduce the proton transport in the fuel cell stack. In addition, the lack of humidification can also result in decreasing the oxygen reduction reaction at the cathode.

Generally, humidifiers come in two different styles, e.g., tube bundle style or sheet style. Sheet style humidifiers use a similar sealing design, assembly, compression, and retention system as for conventional fuel cell stacks. For example, sheet style humidifiers can be dispensed and cured in place. In addition, sheet style humidifiers can include injection molded elastomeric seals that are compressed and retained with an external system. This external system must maintain compression force in order to maintain the sealing of each plate. Undesirably, these styles can require maintaining a compression force. In addition, these styles can have increased processing time, can be costly, and can result in increased thickness.

There is a continuing need for a humidifier plate and method that does not require maintaining a sufficient compression force. Desirably, the humidifier plate and method can reduce processing time, costs, and does not add a significant thickness to a humidifier.

SUMMARY

In concordance with the instant disclosure, a humidifier plate and method that does not require maintaining a sufficient compression force, and which can reduce processing time, costs, and does not add a significant thickness to a humidifier, has been surprisingly discovered.

In certain embodiments, methods for assembling a fuel cell humidifier can include steps of providing a first humidifier plate and a humidifier membrane. The first humidifier plate can have a first top plate surface. The humidifier membrane can have a bottom membrane surface. The bottom membrane surface of the humidifier membrane can be disposed on the first top plate surface of the first humidifier. The first humidifier plate can be partially melted. This can permit the first top plate surface of the first humidifier plate to permeate into the bottom membrane surface of the humidifier membrane. The first humidifier plate can be cooled, which can fuse the first top plate surface of the first humidifier plate with the bottom membrane surface of the humidifier membrane.

In further embodiments, methods for assembling a fuel cell humidifier can include steps of providing a plurality of humidifier plates and a plurality of humidifier membranes. Each of the humidifier membranes can be disposed between two of the humidifier plates to form a plurality of humidifier units. Each of the humidifier units can be stacked to form a humidifier stack. Each of the humidifier plates of the humidifier units in the humidifier stack can be partially melted. This can permit respective plate surfaces of the humidifier plates to permeate into respective membrane surfaces of the humidifier membranes and respective recess perimeters of the humidifier plates. The humidifier plates can be cooled, which can fuse the respective plate surfaces of the humidifier plates with the respective membrane surfaces of the humidifier membranes and the respective recess perimeters of the humidifier plates to form a seal about each of the humidifier membranes.

In yet further embodiments, humidifiers for humidifying a fuel cell can include a first humidifier plate and a humidifier membrane. The first humidifier plate can have a first top plate surface. The humidifier membrane can have a bottom membrane surface. The bottom membrane surface can be fused with the top plate surface of the humidifier plate.

Further areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described herein.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed.

The terms "a" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. The term "about" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected, or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

All documents, including patents, patent applications, and scientific literature cited in this detailed description are incorporated herein by reference, unless otherwise expressly indicated. Where any conflict or ambiguity can exist between a document incorporated by reference and this detailed description, the present detailed description controls.

Figure 3:
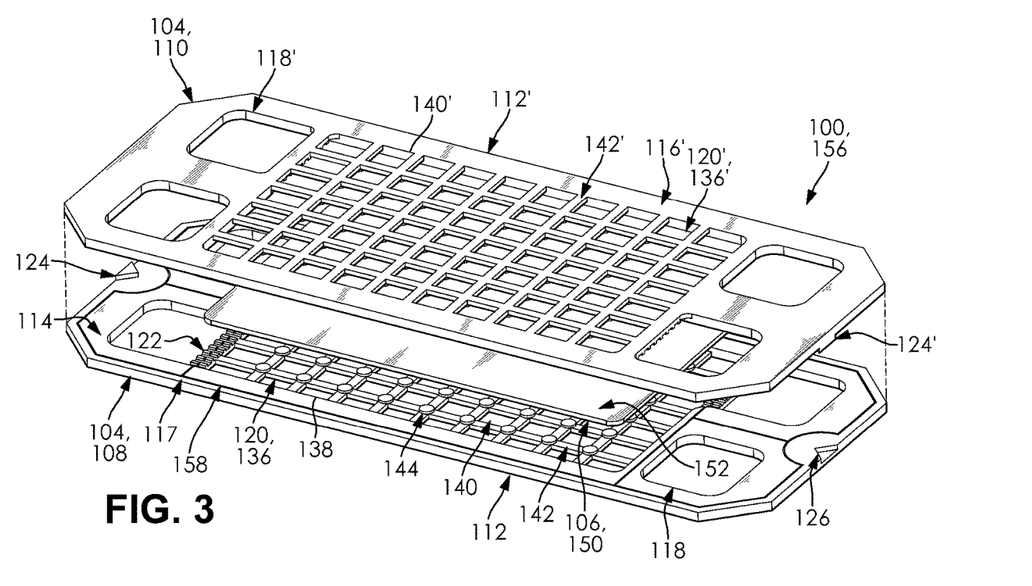
FIG. 3 is an exploded perspective view of the humidifier unit shown in FIG. 2, showing the first humidifier plate, the second humidifier plate, and the humidifier membrane disposed therebetween.
Figure 4:
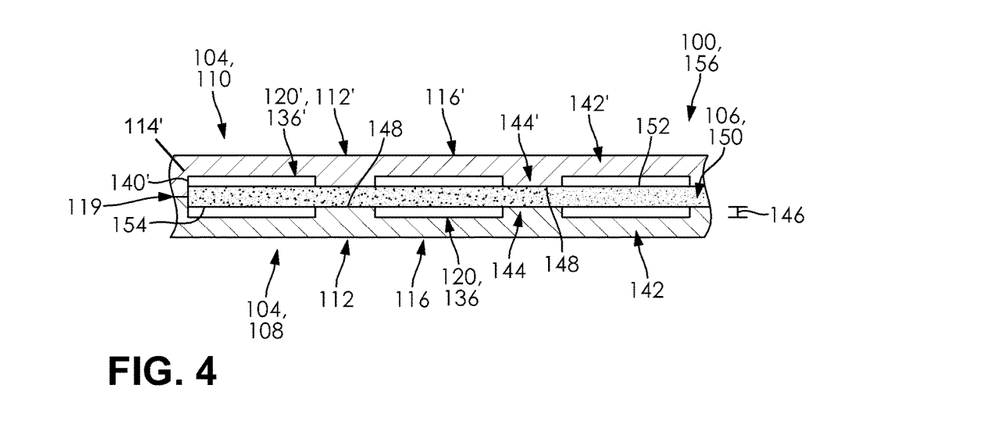
FIG. 4 is a cross-sectional side elevational view of the humidifier unit taken at section line A-A in FIG. 2, including the membrane being suspended in position by the connecting bridges and the spacers of the first humidifier plate and the connecting bridges and the spacers of the second humidifier plate.
Figure 5:
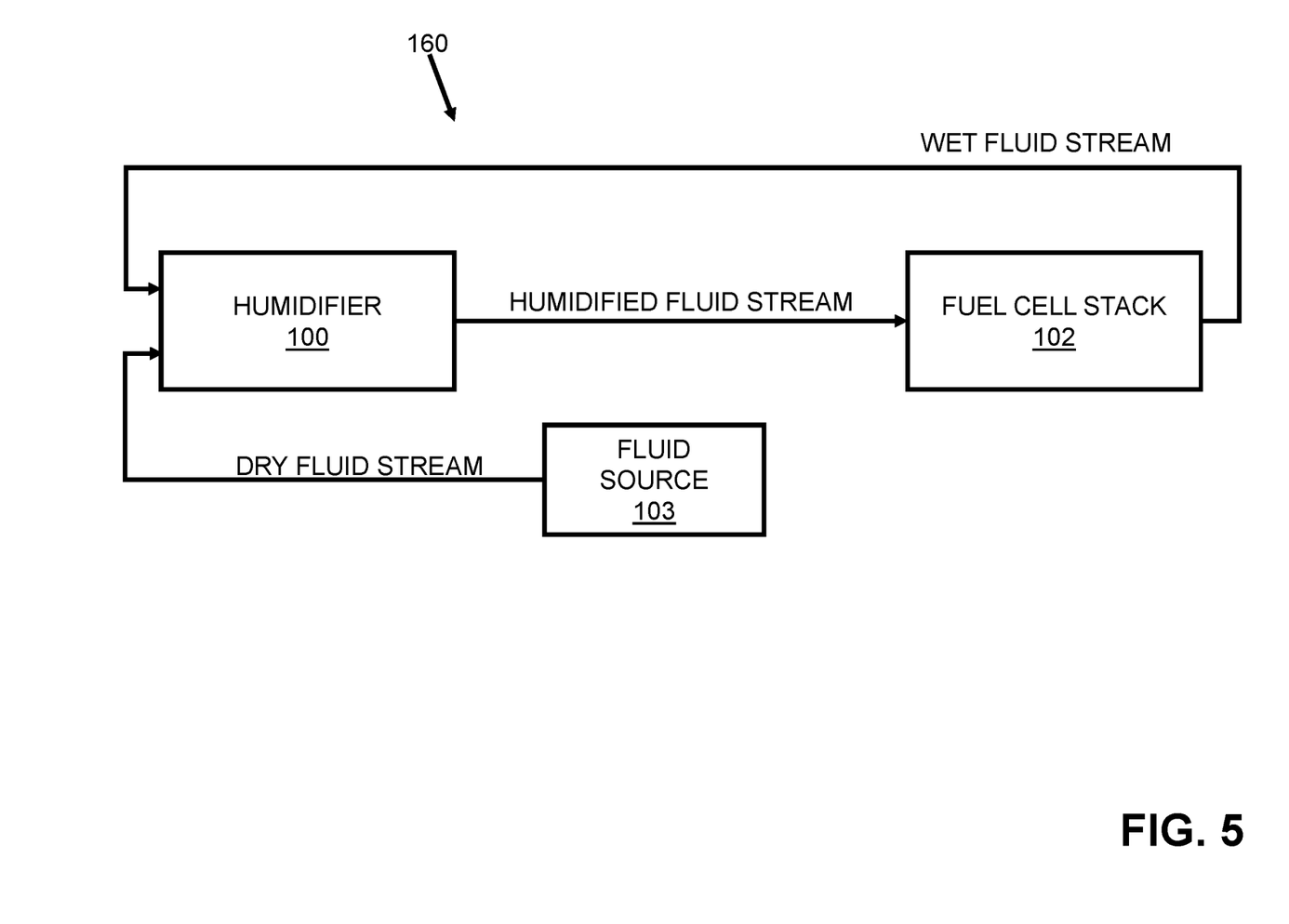
FIG. 5 is a schematic view of the humidifier and a fuel cell stack, according to certain embodiments, including a fluid source, a dry fluid stream, a wet fluid stream, and a humidified fluid stream.

With reference to FIGS. 2-5, a humidifier 100 for humidifying a fuel cell stack 102 is shown. The humidifier 100 can be configured to provide humidity to a dry fluid stream, via a wet fluid stream, that is being sent to the fuel cell stack 102. The dry fluid stream and/or the wet fluid stream can include gases and/or liquids. Non-limiting examples of the dry fluid stream and/or the wet fluid stream can include hydrogen, oxygen, water vapor, and combinations thereof. Other gases and liquids can also be included in the dry fluid stream and/or the wet fluid stream, as desired. In certain examples, the humidifier 100 can be configured to receive the wet fluid stream from an output from the fuel cell stack 102 and receive a dry fluid stream from a fluid source 103, as shown in FIG. 5. As will be discussed below, the humidifier 100 can permit heat and/or water vapor from the wet fluid stream to humidify the dry fluid stream to form a humidified fluid stream before it can be sent to the fuel cell stack 102. However, it should be appreciated that a skilled artisan can employ different configurations for the humidifier 100 and the fuel cell stack 102, within the scope of this disclosure.

Figure 1:
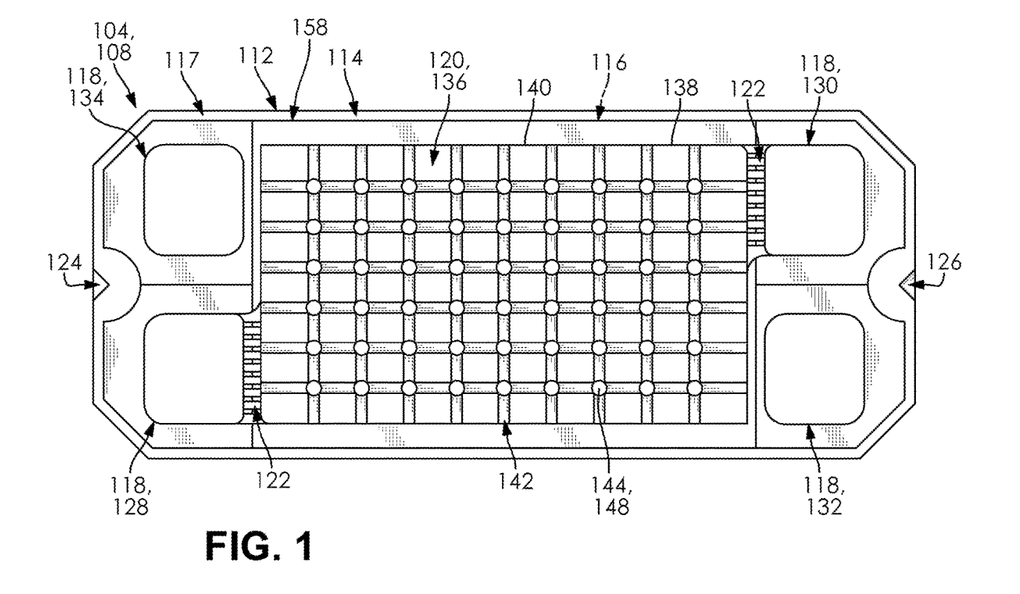
FIG. 1 is a top plan view of a first humidifier plate for a humidifier, according to certain embodiments, including a plurality of header apertures, a flow field having a plurality of connecting bridges and a plurality of spacers, and a plurality of grooves.
Figure 2:
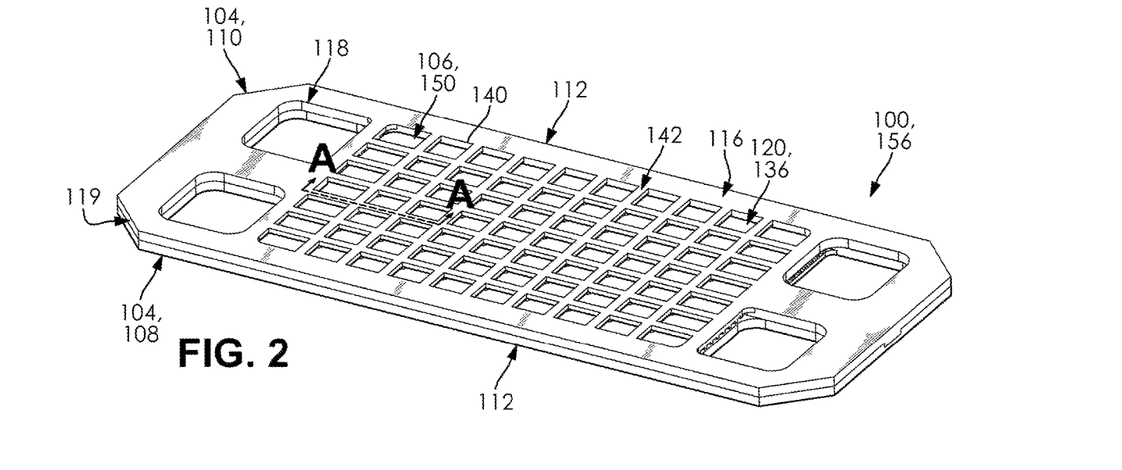
FIG. 2 is a top perspective view of a humidifier unit, according to certain embodiments, including the first humidifier plate, a second humidifier plate, and a humidifier membrane disposed therebetween.

The humidifier 100 can include at least one humidifier plate 104 (shown in FIGS. 1-4) and a humidifier membrane 106 (shown in FIG. 2-4). The humidifier plate 104 can include a plurality of humidifier plates 104. In certain examples, the humidifier plates 104 can include a first humidifier plate 108 and a second humidifier plate 110, as shown in FIGS. 2-3. The second humidifier plate 110 can be similar or identical to the first humidifier plate 108. In addition, reference numerals for like or similar structure for the second humidifier plate 110 are shown in the figures appended with the prime symbol. Each of the humidifier plates 104 can have a plate main body 112. The plate main body 112 can include a top plate surface 114 and a bottom plate surface 116. The top plate surface 114 of the plate main body 112 can include a membrane recess 158 for receiving a portion of the humidifier membrane, where the membrane recess 158 is bounded by a recess perimeter 117. It should be appreciated that a skilled artisan can manufacture the plate main body 112 using a variety of methods. Non-limiting examples can include injection molding, stamping, and/or additive manufacturing. In addition, it should be appreciated that one skilled in the art can scale the number of the humidifier plates 104, as desired.

An entirety of the plate main body 112, the top plate surface 114, and/or the bottom plate surface 116 can be formed from a meltable material. The meltable material can be configured to be pliable or moldable at a certain elevated temperature and solidify upon cooling. In particular, the meltable material can be configured to not substantially melt at room temperature or at a selected operating temperature of the humidifier. Desirably, this can allow the humidifier 100 to operate at room temperature or the selected temperature without melting. In certain examples, the room temperature can be about 68° to 72° degrees. In other examples, the selected operating temperature is the preferred ambient temperature that the humidifier 100 reaches while in operation. However, it should be appreciated that the room temperature or selected operating temperature may varying depending on different factors, such as the humidity, pressure, and/or other environmental factors.

The meltable material can be configured to partially melt at a predetermined temperature. The predetermined temperature can be a temperature that is not typically reached during normal operation of the humidifier 100. In certain examples, the predetermined temperature is greater than the room temperature or the selected operating temperature. When the meltable material partially melts and becomes at least partially liquid, the humidifier membrane 106 can be disposed on one of the humidifier plates 104, which can permit a portion of the meltable material of the humidifier plates 104 to permeate into the humidifier membrane 106. When the meltable material cools and solidifies, the humidifier membrane 106 can be trapped within the meltable material and sealed with one of the humidifier plates 104, as shown in FIGS. 2 and 4. Advantageously, this can permit the humidifier membrane 106 to be sealed with one of the humidifier plates 104 without requiring a substantial compression and retention system. Likewise, the recess perimeters 117 of humidifier plates 104 used to sandwich the humidifier membrane 106 can confront and contact each other, allowing a seal 119 to be formed at the interface thereof. The seal 119 accordingly bounds and seals the humidifier membrane 106 within the cooperating membrane recesses 158 of the humidifier plates 104.

While still referring to FIGS. 2 and 4, the humidifier membrane 106 can be disposed between one of the humidifier plates 104 and another one of the humidifier plates 104. Both of the humidifier plates 104 can then be partially melted and cooled to fuse the both the humidifier plates 104 and the humidifier membrane 106 together. For example, the humidifier membrane 106 can be disposed on the top plate surface 114 of the first humidifier plate 108 and the top plate surface 114' of the second humidifier plate 110. Both of the first humidifier plate 108 and the second humidifier plate 110 can be partially melted and cooled to fuse the humidifier membrane 106, the first humidifier plate 108, and the second humidifier plate 110. In certain examples, where both of the first humidifier plate 108 and the second humidifier plate 110 are partially melted, the recess perimeter 117 of the first humidifier plate 108 and the recess perimeter 117' of the second humidifier plate 110 can be in contact and can partially melt. Then, when the first humidifier plate 108 and the second humidifier plate 110 are cooled, the recess perimeter 117 of the first humidifier plate 108 can fuse with the recess perimeter 117' of the second humidifier plate 110, thereby fusing the first humidifier plate 108 and the second humidifier plate 110 together and creating the seal 119 therebetween and about the humidifier membrane 106, as shown in FIG. 4. It should be appreciated that the seal 119 can be water and/or gas tight. Desirably, this can permit the humidifier membrane 106, the first humidifier plate 108, and the second humidifier plate 110 to be sealed together without requiring a substantial compression and retention system.

The meltable material of the humidifier plate 104 can include a thermoplastic material. The thermoplastic material can be configured to become pliable, moldable, and/or partially liquid at the predetermined temperature. Resistance of the meltable material to water and solvents is advantageous. The meltable material is further selected to be generally impermeable to gases, including water vapor. In certain examples, the thermoplastic material can include a hot melt adhesive. One of ordinary skill in the art may select suitable materials for the meltable material within the scope of the present disclosure.

Where the meltable material includes a hot melt adhesive, the hot melt adhesive can include one or more base materials along with one or more various additives. The composition can be formulated to have a glass transition temperature (onset of brittleness) below the lowest service temperature and a suitably high melt temperature as well. The degree of crystallization can be as high as possible but within limits of allowed shrinkage. The melt viscosity and the crystallization rate (and corresponding open time) can be tailored for the application. Faster crystallization rate usually implies higher bond strength. To reach the properties of semicrystalline polymers, amorphous polymers can require molecular weights too high and, therefore, unreasonably high melt viscosity; the use of amorphous polymers as the hot melt adhesive can be limited to function as one or more modifiers. Certain polymers can be selected that can form hydrogen bonds between their chains, forming pseudo-cross-links which strengthen the polymer.

The meltable material can be formulated using amounts of base materials and additives that are tailored to provide increased tackiness and influence the nature of mutual molecular interactions, as well as interactions with the humidifier membrane 106 substrate. In certain embodiments, one or more ethylene vinyl acetate (EVA) copolymers can be used as base materials with one or more terpene-phenol resins (TPR) as tackifier additives. Further examples include meltable materials including ethylene-vinyl acetate (EVA) copolymers with one or more tackifier resins, waxes, and stabilizers.

Certain embodiments of the meltable material can include one or more of: polyolefins (PO) including polyethylene (LDPE, HDPE), atactic polypropylene (PP or APP), polybutene-1, oxidized polyethylene; amorphous polyolefin (APO/APAO) polymers including amorphous (atactic) propylene (APP), amorphous propylene/ethylene (APE), amorphous propylene/butene (APB), amorphous propylene/hexene (APH), amorphous propylene/ethylene/butene; polyamides; polyesters; polyurethanes, including thermoplastic polyurethane (TPU); styrene block copolymers (SBC) including styrene-butadiene-styrene (SBS), styrene-isoprene-styrene (SIS), styrene-ethylene/butylene-styrene (SEBS), and styrene-ethylene/propylene (SEP); polycaprolactone with soy protein, using coconut oil as plasticizer; polycarbonates; fluoropolymers along with tackifiers and ethylene copolymer with polar groups; and silicone rubbers.

Certain embodiments of the meltable material can include one or more of the following additives: tackifying resins (e.g., rosins and their derivates, terpenes and modified terpenes, aliphatic, cycloaliphatic and aromatic resins (C5 aliphatic resins, C9 aromatic resins, and C5/C9 aliphatic/aromatic resins), hydrogenated hydrocarbon resins, and their mixtures, terpene-phenol resins (TPR, used often with EVAs)); waxes, e.g., microcrystalline waxes, fatty amide waxes or oxidized Fischer-Tropsch waxes; plasticizers (e.g., benzoates such as 1,4-cyclohexane dimethanol dibenzoate, glyceryl tribenzoate, or pentaerythritol tetrabenzoate, phthalates, paraffin oils, polyisobutylene, chlorinated paraffins, etc.); antioxidants and stabilizers (e.g., hindered phenols, BHT, phosphites, phosphates, hindered aromatic amines); added in small amounts (<1%), not influencing physical properties; biocide for hindering bacterial growth; flame retardants; antistatic agents; and fillers.

Now referencing FIGS. 1-3, the plate main body 112 can include a plurality of header apertures 118, a flow field 120, a plurality of grooves 122, a seal protrusion 124, and a seal aperture 126. The header apertures 118 can be configured to receive and/or direct a wet fluid stream and/or a dry fluid stream. In certain examples, the header apertures 118 can include a first header aperture 128, a second header aperture 130, a third header aperture 132, and a fourth header aperture 134, as shown in FIGS. 1-3. The first header aperture 128 can be configured to guide the wet fluid stream over the flow field 120. The second header aperture 130 can be configured to receive the wet fluid stream after it passes over the flow field 120. However, it should be appreciated that a skilled artisan can scale the number of header apertures 118, and provide the header apertures 118 in different configurations, within the scope of this disclosure.

With reference to FIGS. 2-4, the flow field 120 can be configured to be covered by the humidifier membrane 106. The flow field 120 can include a lattice 136. Referring now to FIG. 1, the lattice 136 can be substantially circumscribed by a lip 138, which can substantially contain the wet fluid stream and/or the dry fluid stream in the flow field 120. In certain examples, the lip 138 can be formed around a perimeter of the lattice 136, except adjacent to at least two of the header apertures 118, as shown in FIG. 1. Desirably, this can allow the lip 138 to contain and guide the wet fluid stream and/or the dry fluid stream to travel between the two header apertures 118 that the lip 138 is not formed adjacent to, while militating against the wet fluid stream and/or the dry fluid stream from traveling to the other header apertures 118. In certain examples, the lattice 136 can reassemble a grid or screen-like pattern. However, it should be appreciated that other patterns and forms can also be employed, as desired.

With reference to FIGS. 1-4, the lattice 136 can be formed from a plurality of lattice apertures 140 defined by a plurality of connecting bridges 142. Each of the lattice apertures 140 can be separated by one of the connecting bridges 142. Each of the connecting bridges 142 can be disposed at a bridge depth from a top lip surface of the lip 138 so that each of the connecting bridges 142 are not coplanar with a top lip surface of the lip 138. Desirably, the bridge depth can provide a void for the wet fluid stream and/or the dry fluid stream to expand and fill and move through the flow field 120.

Now referencing FIGS. 1 and 3-4, the plurality of connecting bridges 142 can have a plurality of spacers 144. Each of the spacers 144 can be spaced apart and disposed across the connecting bridges 142. In addition, each of the spacers 144 can have a spacer height 146, as shown in FIG. 4. The spacer height 146 can substantially equal to the bridge depth, thereby permitting a top 148 of each of the spacers 144 to be substantially coplanar with a top lip surface of the lip 138. Each of the spacers 144 can be configured to contact the humidifier membrane 106. Desirably, this can allow the spacers 144 to substantially suspend the humidifier membrane 106 over the connecting bridges 142. In certain examples, the bridge depth, the spacer height 146, and a distance between spacers 144 are of predetermined dimensions that prevent the humidifier membrane 106 from substantially flexing downwardly toward the connecting bridges 142, thereby militating the humidifier membrane 106 from substantially blocking the wet fluid stream and/or the dry fluid stream as it travels across the flow field 120. Each spacer 144 can therefore maintain an open flow field 120 thereabout, and collectively maintain the flow field 120 from the first header aperture 128 to the second header aperture 130.

The lattice 136, due to the lattice apertures 140, can minimize an amount of material needed to form a humidifier plate 104. It is possible to forgo the lattice apertures 140 and connecting bridges 142 and have a solid and continuous support (not shown) for the spacers 144. Otherwise, with the lattice apertures 140, a solid layer or film (not shown) can be used to seal and enclose the plurality of lattice apertures 140 of the lattices 136 of the plates 104 on the outside thereof.

With reference to FIGS. 1 and 3, the grooves 122 can be disposed adjacent to at least one of the header apertures 118 and the flow field 120. Each of the grooves 122 can be configured to permit the wet fluid stream and/or the dry fluid stream to flow between at least one of the header apertures 118 and the flow field 120. In certain examples, the grooves 122 can be disposed adjacent to the one of the header apertures 118 and another one of the header apertures 118. Desirably, this can allow the wet fluid stream and/or the dry fluid stream to flow from one of the header apertures 118, across the flow field 120, and to another of the header apertures 118.

While still referring to FIGS. 1 and 3, the seal protrusion 124 can be a raised surface formed on the plate main body. The seal aperture 126 of one of the humidifier plates 104 can be configured to receive the seal protrusion 124 of another one of the humidifier plates 104. The seal aperture 126 can correspond to the seal protrusion 124 to permit the seal aperture 126 to more easily receive the seal protrusion 124. For example, the seal protrusion 124 of the first humidifier plate 108 can be disposed in the seal aperture 126' of the second humidifier plate 110. Desirably, this can align the first humidifier plate 108 and the second humidifier plate 110, so they can be sufficiently sealed together when melted together.

The first humidifier plate 108 and the second humidifier plate 110, for example, can each be substantially identical, as per the first humidifier plate shown in FIG. 1. One of the first humidifier plate 108 and the second humidifier plate 110 can accordingly be flipped over with respect to the other of the first humidifier plate 108 and the second humidifier plate 110, with the humidifier membrane 106 positioned therebetween. In this manner, the seal protrusions 124 engage the seal apertures 126 of the opposing and confronting plate 108, 110, the spacers 144 of each plate contact a respective side of the humidifier membrane 106, the humidifier membrane 106 is bounded by a membrane recess 158 of each plate 108, 110, and the recess perimeters 117 of each plate 108, 110 are in contact. The third header aperture 132 can therefore guide a fluid stream over a flow field 120' formed on the other side of the humidifier membrane 106 to the fourth header aperture 134.

The humidifier membrane 106 can be configured to allow the wet fluid stream to humidify the dry fluid stream before the dry fluid stream is sent to the fuel cell stack 102. The humidifier membrane 106 can include a plurality of humidifier membranes 106. Each of the humidifier membranes 106 can have a membrane main body 150 with a top membrane surface 152 and a bottom membrane surface 154. Each of the humidifier membranes 106 can be configured to be disposed between one of the humidifier plates 104 and another one of the humidifier plates 104. For example, the bottom membrane surface 154 of the humidifier membrane 106 can be disposed on the top plate surface 114 of the first humidifier plate 108 and the top plate surface 114' of the second humidifier plate 110 can be disposed on the top membrane surface 152 of the humidifier membrane 106, as shown in FIGS. 2-3.

In this manner, there can be one or more instances of a humidifier membrane 106 disposed between two humidifier plates 104. Each humidifier membrane 106 disposed between two humidifier plates 104 can be referred to as a plate-membrane-plate sandwich or humidifier unit 156. A stack (not shown) can be formed of such plate-membrane-plate sandwiches or humidifier units 156. Whether one humidifier unit 156 is formed, or a stack of plate-membrane-plate sandwiches are formed, solid layers or films (not shown) can be used to seal and enclose the plurality of lattice apertures 140 of the lattices 136 of the plates 104 on the outside of each sandwich.

The humidifier membrane 106 can be configured to be a water vapor permeable membrane. This can allow heat and/or water vapor from the wet fluid stream to pass through the humidifier membrane 106 to humidify the dry fluid stream before it can be sent to the fuel cell stack 102. For example, where the humidifier membrane 106 is disposed between the first humidifier plate 108 and the second humidifier plate 110 and between the wet fluid stream and the dry fluid stream, the humidifier membrane 106 can permit heat and/or water vapor from the wet fluid stream to pass through the humidifier membrane 106 to humidify the dry fluid stream. Desirably, this can allow the heat and/or water vapor from the wet fluid stream to humidify the dry fluid stream before it can be sent to the fuel cell stack 102. In certain examples, the humidifier membrane is similar and/or identical to the humidifier membrane 106 described in U.S. Pat. No. 8,091,868 to Robb et al., the entire disclosure of which is incorporated herein by reference. Certain embodiments of the humidifier membrane 106 can include expanded polytetrafluoroethylene (ePTFE). Other non-limiting examples can include humidifier membranes 106 formed from any conventional membrane including perfluorosulfonic acid (PFSA), such as the membrane sold under the trademark Nafion®, a hydrophilic polymer membrane, a hydrocarbon-based membrane, and a polymer composite membrane, for example. However, it should be appreciated that a skilled artisan can employ different technologies for the humidifier membrane 106, within the scope of this disclosure.

In certain examples, the header apertures 118 can all be aligned, and the dry fluid stream across each humidifier unit 156 in one direction and the wet fluid stream across each plate-membrane-plate sandwich in another direction, where the wet fluid stream and dry fluid stream exchange humidity. The stack of humidifier units 156 can therefore provide large surface area for humidity exchange (essentially the sum of all the membrane areas).

Figure 6:
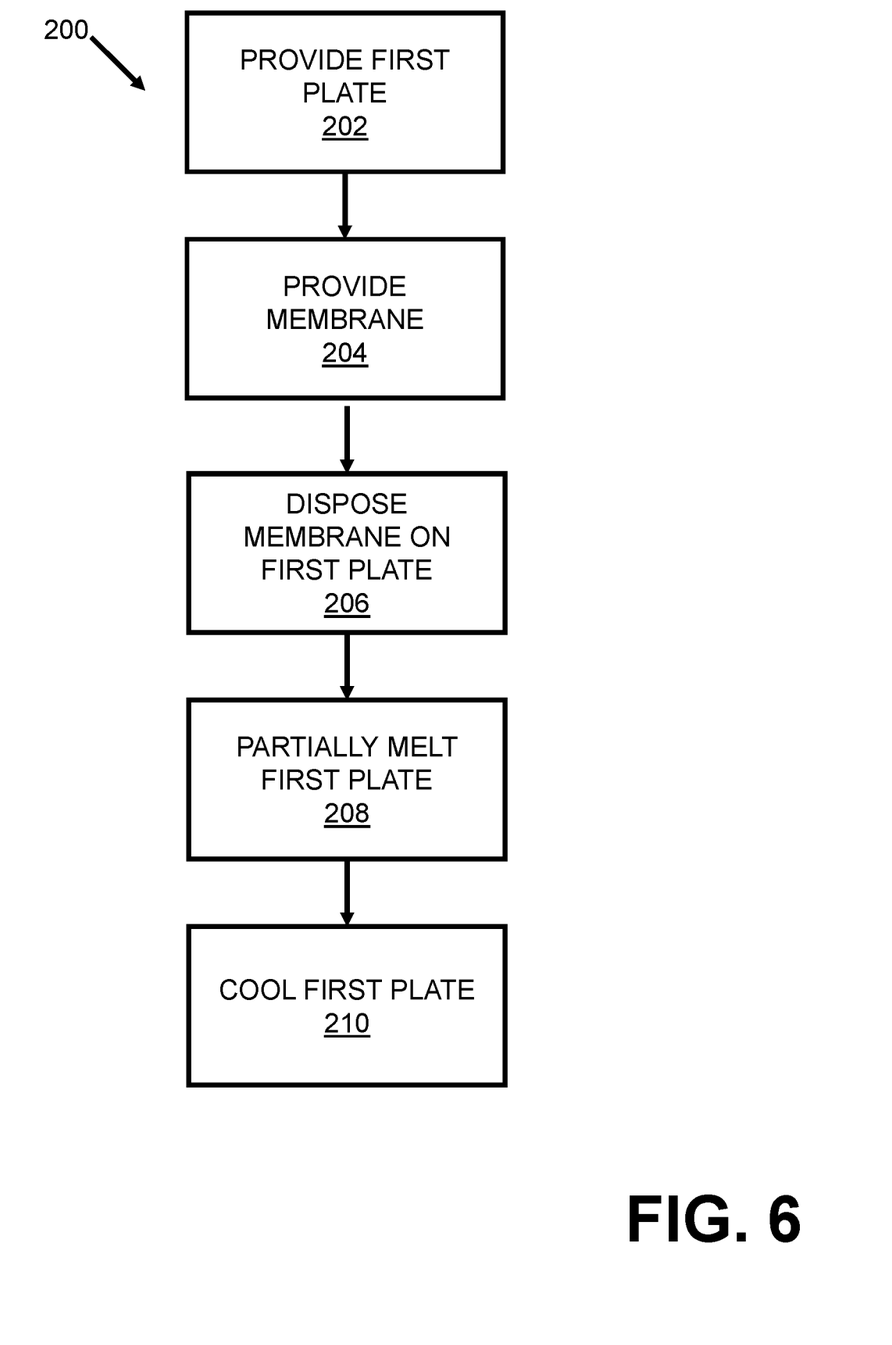
FIG. 6 is a flowchart showing a method for assembling the humidifier, according to certain embodiments, the method using the first humidifier plate and the membrane.

As shown in FIG. 6, an embodiment of a method 200 for assembling the humidifier 100 is shown. The method 200 can have a step 202 of providing the first humidifier plate 108 and a step 204 of providing the humidifier membrane 106. In a step 206, the bottom membrane surface 154 of the humidifier membrane 106 can be disposed on the top plate surface 114 of the first humidifier plate 108. The first humidifier plate 108 can be partially melted, thereby permitting the bottom membrane surface 154 of the humidifier membrane 106 to permeate into the top plate surface 114 of the first humidifier plate 108, in a step 208. In a step 210, the first humidifier plate 108 can be cooled, thereby fusing the top plate surface 114 of the first humidifier plate 108 with the bottom membrane surface 154 of the humidifier membrane 106. Advantageously, this can permit the humidifier membrane 106 to be sealed with the first humidifier plate 108 without requiring a substantial compression and retention system.

Figure 7:
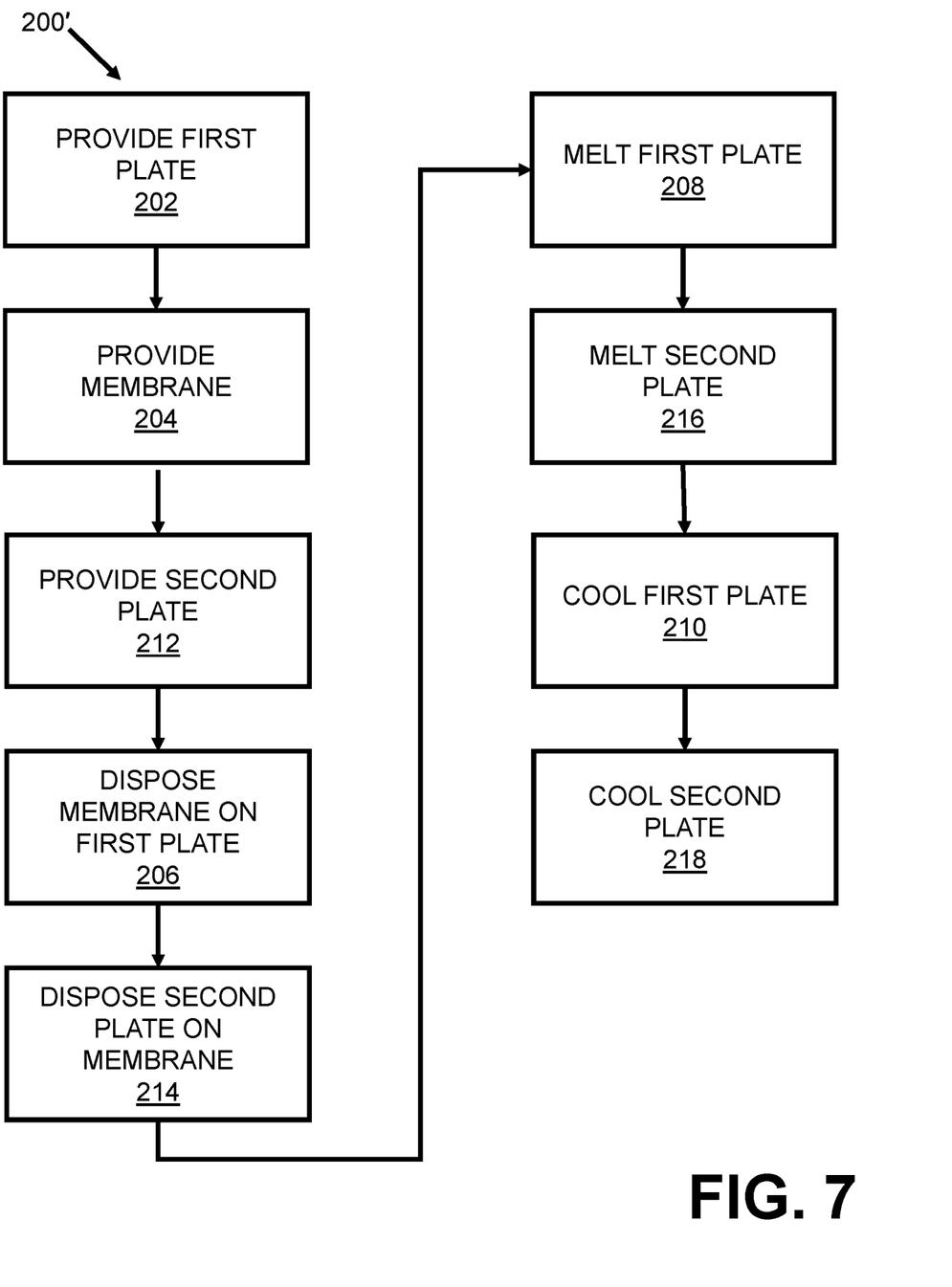
FIG. 7 is a flowchart showing another method for assembling the humidifier, according to certain embodiments, the method using the first humidifier plate, the second humidifier plate, and the humidifier membrane.

With reference to FIG. 7, a method 200' can also include a step 212 of providing the second humidifier plate 110. In a step 214, the top plate surface 114' of the second humidifier plate 110 can be disposed on the top membrane surface 152 of the humidifier membrane 106. The second humidifier plate 110 can be partially melted, thereby permitting the top plate surface 114' of the second humidifier plate 110 to permeate into the top membrane surface 152 of the humidifier membrane 106, in a step 216. This can also allow the recess perimeter 117' of the second humidifier plate 110 to permeate into the recess perimeter 117 of the first humidifier plate 108. In a step 218, the second humidifier plate 110 can be cooled, thereby fusing the top plate surface 114' of the second humidifier plate 110 with the top membrane surface 152 of the humidifier membrane 106. In addition, this can also fuse the recess perimeter 117' of the second humidifier plate 110 with the recess perimeter 117 of the first humidifier plate 108. Desirably, this can permit the humidifier membrane 106, the first humidifier plate 108, and the second humidifier plate 110 to be sealed together without requiring a substantial compression and retention system.

Figure 8:
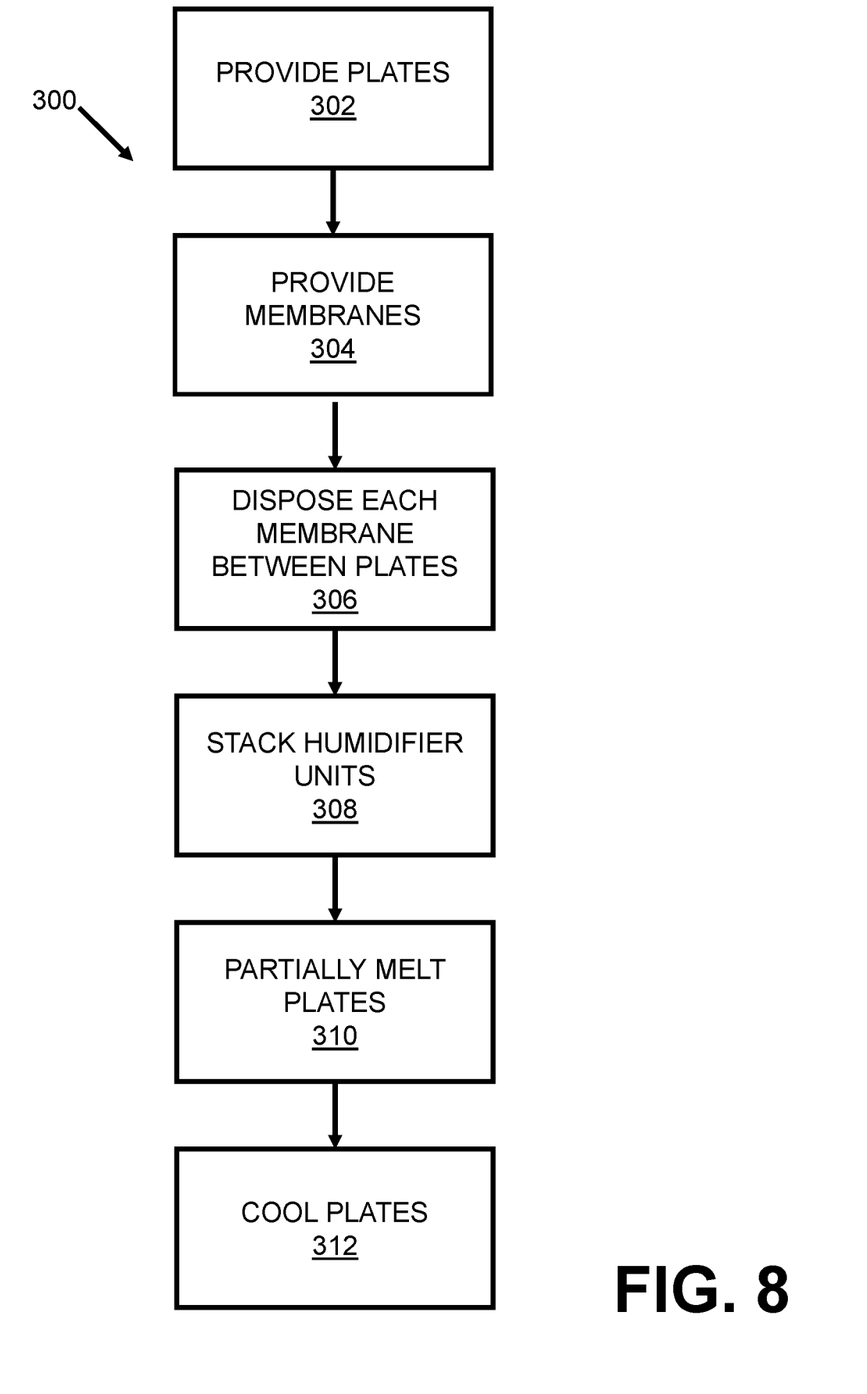
FIG. 8 is a flowchart showing yet another method for assembling the humidifier, according to certain embodiments, the method using a plurality of humidifier plates and a plurality of humidifier membranes.

Now referring to FIG. 8, another method 300 for assembling the humidifier 100 is shown. The method 300 can have a step 302 of providing the plurality of humidifier plates 104 and a step 304 of providing the plurality humidifier membranes 106. In a step 306, each of the humidifier membranes 106 can be disposed between two of the humidifier plates 104, thereby forming the humidifier unit 156. In certain examples, this can be accomplished at room temperature since the humidifier plates 104 may not melt at room temperature. In a step 308, each of the humidifier units 156 can be stacked to form a humidifier stack. Each of the humidifier plate 104 can be partially melted, thereby permitting respective plate surfaces (the top plate surface 114) of each of the humidifier plates 104 to permeate into respective membrane surfaces (the top membrane surface 152 and/or the bottom membrane surface 154) of each of the humidifier membranes 106 and respective recess perimeters (the recess perimeter 117) of each of the humidifier membranes 106, in a step 310. In some instances, each of the humidifier plates 104 can be partially melted by substantially heating an entirely of the humidifier unit 156. In other instances, the humidifier plates 104 can be partially melted by heating each of the humidifier plates 104 individually. In a step 312, each of the humidifier plates 104 can be cooled, thereby fusing the respective plate surfaces of the humidifier plates 104 with the respective membrane surfaces of the humidifier membranes 106 and the respective recess perimeters of the humidifier plates 104 to form the seal 119 about each of the humidifier membranes. Advantageously, this can permit each of the humidifier membranes 106 to be sealed between two of the humidifier plates 104 without requiring a substantial compression and retention system.

With reference to FIG. 5, a fuel cell system 160 is shown. The fuel cell system 160 can include the fuel cell stack 102, the fluid source 103, and the humidifier 100. The fuel cell stack 102 can be configured to output the wet fluid stream. The fluid source 103 can be configured to output the dry fluid stream. The humidifier 100 can be configured to receive the wet fluid stream and the dry fluid stream. The humidifier 100 can also be configured to humidify the dry fluid stream with the wet fluid stream, thereby form the humidified fluid stream. The humidifier 100 can provide the humidified fluid stream to the fuel cell stack 102. Desirably, the humidified fluid stream can militate against the humidifier membrane 106 from becoming dry.

Advantageously, the humidifier 100 and methods 200, 300 provided by the present technology may not require maintaining a sufficient compression force. For example, the meltable material can allow the humidifier plates 104 and the humidifier membrane 106 to be joined together without requiring a compression and retention system. Desirably, by not requiring a compression and retention system, the humidifier 100 and methods 200, 300 can reduce processing time, costs, and may not add additional thickness to the humidifier 100.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A method for assembling a fuel cell humidifier, the method comprising:
    providing a first humidifier plate with a first top plate surface and a first recess perimeter, and a second humidifier plate with a second top plate surface and a second recess perimeter;
    providing a humidifier membrane with a bottom membrane surface;
    disposing the bottom membrane surface of the humidifier membrane on the first top plate surface of the first humidifier plate;
    disposing the second top plate surface of the second humidifier plate on a top membrane surface of the humidifier membrane;
    partially melting the first humidifier plate, thereby permitting the first top plate surface of the first humidifier plate to permeate into the bottom membrane surface of the humidifier membrane;
    partially melting the second humidifier plate, thereby permitting the top membrane surface of the humidifier membrane to permeate into the second top plate surface of the second humidifier plate and the second recess perimeter of the second humidifier plate to contact the first recess perimeter of the first humidifier plate; and
    cooling the first humidifier plate, thereby fusing the first top plate surface of the first humidifier plate with the bottom membrane surface of the humidifier membrane.

2. The method of claim 1, wherein the method includes cooling the second humidifier plate, thereby fusing the second top plate surface of the second humidifier plate with the top membrane surface of the humidifier membrane and fusing the second recess perimeter of the second humidifier plate with the first recess perimeter of the first humidifier plate to form a seal about the humidifier membrane.

3. A method for assembling a fuel cell humidifier, the method comprising:
    providing a plurality of humidifier plates;

providing a plurality of humidifier membranes;

disposing each of the humidifier membranes between a respective pair of two of the humidifier plates to form a plurality humidifier units;

stacking each of the humidifier units together to form a humidifier stack;

partially melting each of the humidifier plates of the humidifier units in the humidifier stack, thereby permitting respective plate surfaces of the humidifier plates to permeate into respective membrane surfaces of the humidifier membranes and respective recess perimeters of the humidifier plates to contact each other; and cooling each of the humidifier plates, thereby fusing the respective plate surfaces of the humidifier plates with the respective membrane surfaces of the humidifier membranes and fusing the respective recess perimeters of the humidifier plates to form a seal about each of the humidifier membranes.

4. The method of claim 3, wherein forming the humidifier stack is performed at a temperature where the plurality of humidifier plates do not partially melt.

5. The method of claim 3, wherein partially melting each of the humidifier plates is performed by substantially heating an entirety of the humidifier stack.

* * * * *